US010545548B2

(12) United States Patent
Nakada

(10) Patent No.: US 10,545,548 B2
(45) Date of Patent: Jan. 28, 2020

(54) MEMORY DEVICE AND HOST DEVICE

(71) Applicant: Toshiba Memory Corporation, Minato-ku (JP)

(72) Inventor: Yoshiyuki Nakada, Kamakura (JP)

(73) Assignee: Toshiba Memory Corporation, Minato-ku (JP)

( * ) Notice: Subject to any disclaimer, the term of this patent is extended or adjusted under 35 U.S.C. 154(b) by 303 days.

(21) Appl. No.: 15/254,609

(22) Filed: Sep. 1, 2016

(65) Prior Publication Data

US 2017/0255238 A1 Sep. 7, 2017

Related U.S. Application Data

(60) Provisional application No. 62/304,638, filed on Mar. 7, 2016.

(51) Int. Cl.
*G06F 3/06* (2006.01)
*G06F 1/24* (2006.01)

(52) U.S. Cl.
CPC .............. *G06F 1/24* (2013.01); *G06F 3/0605* (2013.01); *G06F 3/0688* (2013.01)

(58) Field of Classification Search
CPC .... G06F 3/0653; G06F 3/0656; G06F 3/0679; G06F 1/24; G06F 3/0605; G06F 3/0688; G06F 3/0689; G06F 3/0635; G06F 3/689
USPC .......................................................... 711/166
See application file for complete search history.

(56) References Cited

U.S. PATENT DOCUMENTS

| | | | | |
|---|---|---|---|---|
| 4,924,427 | A * | 5/1990 | Savage | G06F 13/32 710/26 |
| 6,571,354 | B1 * | 5/2003 | Parks | G06F 11/008 714/6.32 |
| 2010/0088467 | A1 * | 4/2010 | Lee | G06F 12/0246 711/104 |
| 2013/0067144 | A1 * | 3/2013 | Namba | G06F 3/0611 711/103 |
| 2013/0124888 | A1 * | 5/2013 | Tanaka | G11C 16/06 713/320 |
| 2013/0124932 | A1 | 5/2013 | Schuh et al. | |
| 2015/0089287 | A1 * | 3/2015 | Jayakumar | G06F 1/30 714/23 |

FOREIGN PATENT DOCUMENTS

| | | |
|---|---|---|
| JP | 2010-108497 | 5/2010 |
| JP | 2014-535120 | 12/2014 |
| WO | WO 2014/108943 A1 | 7/2014 |

* cited by examiner

*Primary Examiner* — Hashem Farrokh
(74) *Attorney, Agent, or Firm* — Oblon, McClelland, Maier & Neustadt, L.L.P.

(57) ABSTRACT

According to one embodiment, a memory device includes a memory and a controller circuit. The memory holds first data and second data. The first data and the second data are results of monitoring state of the memory device. The first data and the second data include values indicating results of monitoring attributes common between these data. The values are updated according to operation status of the memory device. The controller circuit switches an object to be read from the memory between the first data and the second data.

17 Claims, 4 Drawing Sheets

21 HOST CONTROLLER
11 MEMORY CONTROLLER
12 NON-VOLATILE MEMORY
S1 REGISTRATION COMMAND (SET NUMBER)
S2 STORE SET NUMBER
S3 RESET COMMAND
S4 RESET VALUES IN DESIGNATED SET

MEMORY DEVICE AND HOST DEVICE

CROSS-REFERENCE TO RELATED APPLICATIONS

This application is based upon and claims the benefit of priority from U.S. Provisional Application No. 62/304,638, filed on Mar. 7, 2016; the entire contents of which are incorporated herein by reference.

FIELD

Embodiments described herein relate generally to a memory device and a host device.

BACKGROUND

As one function of a memory device, there is known the function of monitoring the state of the memory device for each inspection item to record state information that is the monitoring results. The memory device updates the state information according to operation status.

DETAILED DESCRIPTION

In general, according to one embodiment, a memory device includes a memory and a controller circuit. The memory holds first data and second data. The first data and the second data are results of monitoring the state of the memory device. The first data and the second data include values indicating results of monitoring attributes common between these data. The values are updated according to operation status of the memory device. The controller circuit switches an object to be read from the memory between the first data and the second data.

Exemplary embodiments of a memory device and a host device will be explained below in detail with reference to the accompanying drawings. The present invention is not limited to the following embodiments.

First Embodiment

Figure 1:
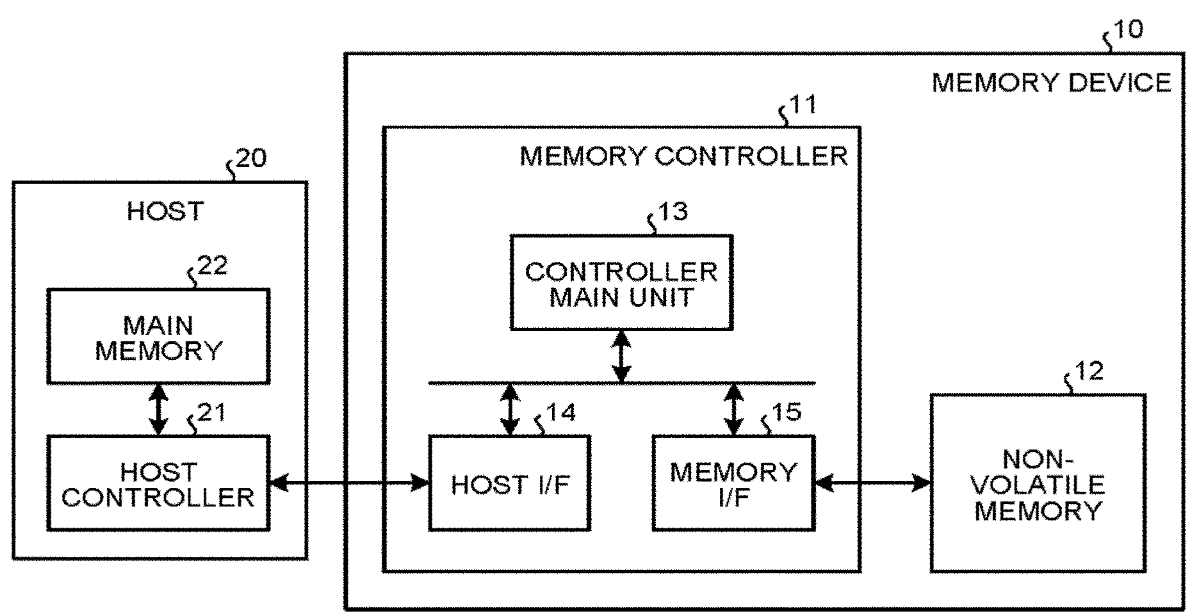
FIG. 1 is a diagram showing the basic configuration of a system of a first embodiment.

FIG. 1 is a diagram showing the basic configuration of the system of the first embodiment. The system includes a memory device 10 and a host device (hereinafter the host for short) 20.

The memory device 10 is a HDD (Hard Disc Drive), an SSD (Solid State Drive), or the like. The memory device 10 functions as an external storage device for the host 20. The host 20 is an electronic device such as a personal computer or a mobile terminal. The memory device 10 and the host 20 are connected to each other via a communication path.

The memory device 10 includes a memory controller 11 and a nonvolatile memory 12. The nonvolatile memory 12 is a semiconductor memory such as a NAND flash memory or a magnetic disk or the like. The nonvolatile memory 12 holds user data transmitted from the host 20 and management information of the memory device 10. The nonvolatile memory 12 stores w e to cause a controller main unit 13, the main controller of the memory device 10, to operate.

The memory controller 11 that is a controller circuit includes the controller main unit 13, a host interface (I/F) 14, and a memory interface (I/F) 15. The controller main unit 13, host I/F 14, and memory I/F 15 are connected via an internal bus. The memory controller 11 performs data transfer to/from the host 20. The memory controller 11 controls data write to the nonvolatile memory 12 and data read from the nonvolatile memory 12.

The controller main unit 13 is the main controller of the memory device 10 and controls the components of the memory device 10 overall. The controller main unit 13 is, for example, a microcomputer unit including a CPU (Central Processing Unit). The CPU realizes the functions of the controller main unit 13 by executing the firmware loaded from the nonvolatile memory 12.

The host I/F 14 is a connection interface for a communication path with the host 20. The memory I/F 15 is a connection interface for the nonvolatile memory 12.

The host 20 includes a host controller 21 and a main memory 22. The main memory 22 is constituted by, e.g., a DRAM (Dynamic Random Access Memory). The main memory 22 is used as a program expansion area and work area when the host 20 executes a program.

The host controller 21 that is a controller circuit performs data transfer to/from the memory device 10. The host controller 21 issues commands to be transmitted to the memory device 10.

The memory device 10 has a self-check function to monitor the operation state of the memory device 10 for each inspection item (attribute). The self-check function is a function of S.M.A.R.T. (Self-Monitoring Analysis and Reporting Technology) or pursuant thereto. The memory device 10 records state information that is the monitoring results into the nonvolatile memory 12. The memory device 10 transmits the state information in the nonvolatile memory 12 to the host 20 according to a request from the host 20.

Figure 2:
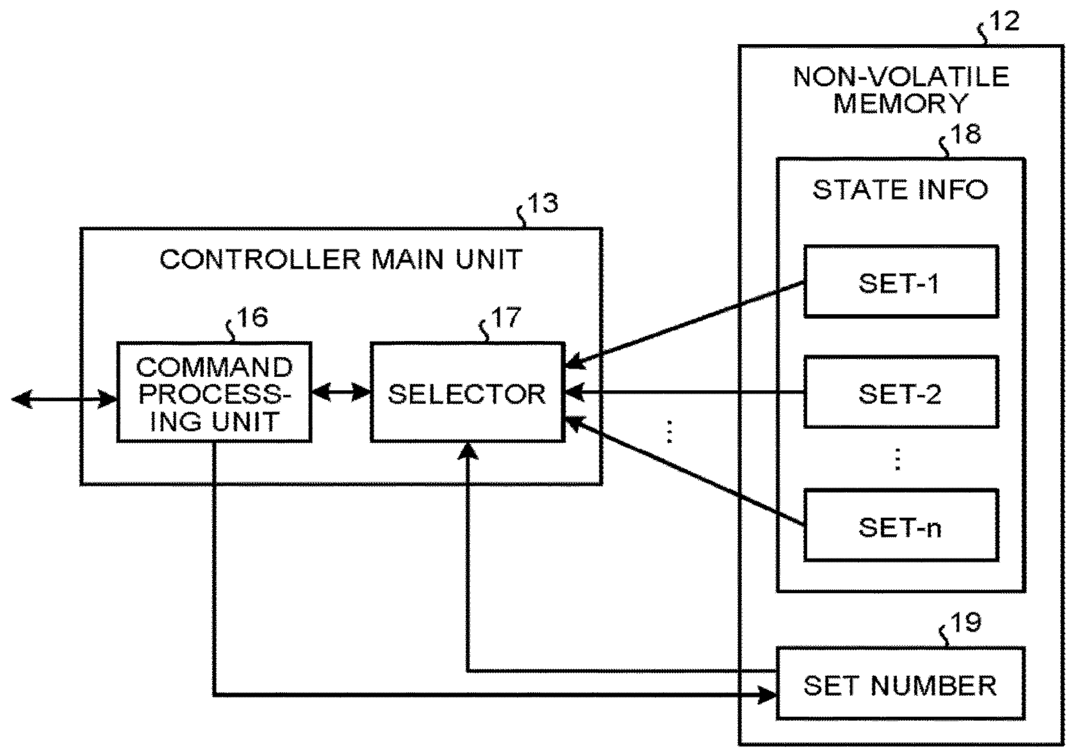
FIG. 2 is a diagram showing the functional configuration of a controller main unit in a memory device shown in FIG. 1 and information stored in a nonvolatile memory.

FIG. 2 is a diagram showing the functional configuration related to reading and resetting the state information of the controller main unit 13 in the memory device 10 and information stored in the nonvolatile memory 12.

The nonvolatile memory 12 holds the state information 18 and a set number 19. The state information 18 and the set number 19 are stored in predetermined storage areas of the nonvolatile memory 12 respectively. The state information 13 and the set number 19 may be stored in any areas of the nonvolatile memory 12 or in a memory other than the nonvolatile memory 12.

The controller main unit 13 gathers a value indicating the monitoring result for each attribute to form a set of values and stores it in the nonvolatile memory 12. The state information 18 is stored as n number of sets (SET-1, SET-2, . . . , SET-n) in the nonvolatile memory 12. Each of the n number of sets includes values indicating the results of monitoring attributes common between the sets. Set numbers (1, 2, . . . , n) are given to the n number of sets. For example, a set number “1” is given to SET-1.

The controller main unit 13 updates the values in each set according to the operation status of the memory device 10. In the embodiment, detailed description of monitoring the state of the memory device 10 and writing the state information 18 that is the monitoring results is omitted.

Let SET-1, one of the n number of sets, be first data that cannot be reset according to a reset request from the host 20. Let each of SET-2, . . . , SET-n, other sets than SET-1, of the n number of sets be second data that can be reset according to a reset request from the host 20. Here n is any integer of three or greater. Resetting a set means that all the values included in the set are rewritten to be initial values. The number of the sets that are second data is not limited to two or greater but may be one.

The set number 19 designates the set to be accessed according to a request from the host 20. The set number 19 designating one of the n number of sets is registered as access information in the memory device 10. The nonvolatile memory 12 holds the registered set number 19.

The controller main unit 13 can switch the set from which to read the state information 18 between the n number of sets by registering the set number 19. Further, the controller main unit 13 can switch the set in which to reset the state information 10 between the n−1 number of sets (SET-2, . . . , SET-n) by registering the set number 19.

The controller main unit 13 includes a command processing unit 16 and a selector 17. The command processing unit 16 receives commands from the host 20 to perform processing according to the command. The command processing unit 16 transmits the processing result to the host 20.

When instructed by the command processing unit 16 to access the state information 18, the selector 17 selects the set designated by the registered set number 19 as the object to be accessed.

When a command which is a request to read the state information 18 is received, the command processing unit 16 outputs a read instruction. When the read instruction is inputted, the selector 17 reads the set designated by the set number 19 from the nonvolatile memory 12 and outputs the read set to the command processing unit 16. The command processing unit 16 transmits the read set to the host 20.

When a command which is a request to reset the state information 18 is received, the command processing unit 16 outputs a reset instruction. When the reset instruction is inputted, the selector 17 resets the set designated by the set number 19.

When a command requests to register the set number 19, the command processing unit 16 stores the set number 19 into the state information 18.

Figure 3:
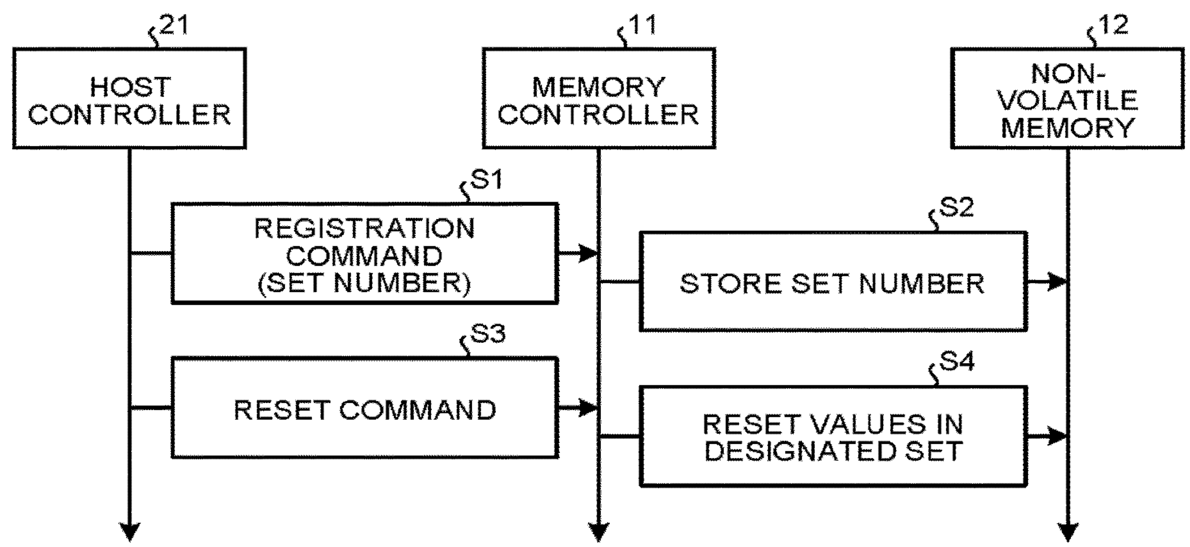
FIG. 3 is a diagram that explains the operation of a memory controller and a host controller shown in FIG. 1 resetting state information.

FIG. 3 is a diagram that explains the operation related to the memory controller 11 and the host controller 21 resetting the state information 18. The host controller 21 issues a registration command (first command) that is a request to register a set number. The registration command includes a set number designating the set to be reset. The host controller 21 transmits the issued registration command to the memory device 10 (S1).

When receiving the registration command, the memory controller 11 stores the set number into the nonvolatile memory 12, thereby registering the set number (S2). The nonvolatile memory 12 holds the registered set number 19.

Note that the procedure of S1 and S2 may be omitted from the process of resetting the state information 18. If the procedure of S1 and S2 is omitted, the memory controller 11 takes the set designated by the set number 19 that has been registered when the reset request is received as the object to be reset.

The host controller 21 issues a reset command (second command) that is a request to reset the state information 18. The host controller 21 transmits the issued reset command to the memory device 10 (S3).

When receiving the reset command, the memory controller 11 resets the values in the set designated based on the registered set number 19 out of the state information 18 held in the nonvolatile memory 12 (S4).

Here, where “1” indicating SET-1 is registered as the set number 19, the memory controller 11 prohibits executing the reset command and performs predetermined error processing. The memory controller 11 excludes SET-1 from objects to be reset according to a request from the host 20 so as to prevent the values in SET-1 from being reset.

Where the value indicating one of SET-2, . . . , SET-n is registered as the set number 19, the memory controller 11 resets the values in the set given that value as the set number. For the reset set, updating the values according to the operation status of the memory device 10 is resumed starting from initial values.

Figure 4:
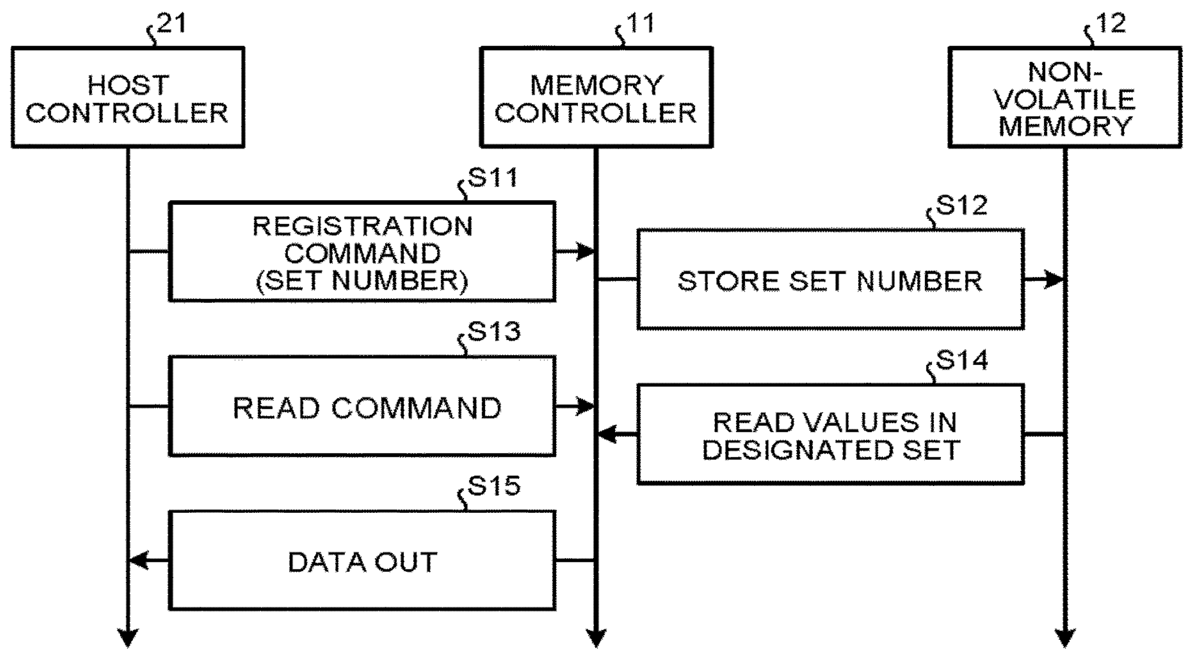
FIG. 4 is a diagram that explains the operation of the memory controller and the host controller shown in FIG. 1 reading state information.

FIG. 4 is a diagram that explains the operation related to the memory controller 11 and the host controller 21 reading the state information 18. The host controller 21 issues a registration command (first command) that is a request to register a set number. The registration command includes a set number designating the set to be reset. The host controller 21 transmits the issued registration command to the memory device 10 (S11).

When receiving the registration command, the memory controller 11 stores the set number into the nonvolatile memory 12, thereby registering the set number (S12). The nonvolatile memory 12 holds the set number 19.

Note that the procedure of S11 and S12 may be omitted from the process of reading the state information 18. If the procedure of S11 and S12 is omitted, the memory controller 11 takes the set designated by the set number 19 that has been registered when the read request is received as the object to be read.

The host controller 21 issues a read command (second command) that is a request to read the state information 18. The host controller 21 transmits the issued read command to the memory device is (S13). The read command includes an address referring to the forage area in which the state information 18 is stored.

When receiving the read command, the memory controller 11 reads the values in the set designated based on the registered set number 19 out of the state information 18 held in the nonvolatile memory 12 (S14). The memory controller 11 transmits the read values to the host controller 21 (DATA OUT) (S15).

The memory device 10 holds the results of monitoring the operation state of the memory device 10 during the total period from the production or shipment of the memory device 10 in the set SET-1, which cannot be reset. The memory device 10 can hold the results of monitoring the operation state of the memory device 10 during any monitoring period in the sets SET-2, . . . , SET-n, which can be reset.

Here, one usage example of the memory device 10 related to reading and resetting the state information 18 will be described. The vendor of the memory device 10 resets all the attribute values in each of the n number of sets at the time of the shipment of the memory device 10 or so on. For all the sets, the value of each attribute continues being rewritten as needed starting from an initial value according to the operation status of the memory device 10 after this initialization.

A user who was provided with the memory device 10 from the vendor of the memory device 10 resets the values of one, for example, SET-2 of the n−1 number of sets that are the second data. The host 20, which has the capability of registering information about access to the memory device 10, transmits a registration command and a reset command whose access destination is SET-2 to the memory device 10. The memory device 10 registers SET-2 as the access destination according to the registration command. The memory device 10 resets the values of SET-2 registered as the access destination according to the reset command.

For example, when starting a test of a system including the memory device 10, the user, through the host 20, instructs the memory device 10 to reset the values of SET-2. In SET-2, the value of each attribute continues being updated starting from its initial value according to the operation state of the memory device 10 in the test. For other sets than SET-2, updating the value of each attribute which has continued since before the start of the test, continues.

When the test finishes, the host 20 transmits a read command to the memory device 10. The memory device 10 reads the values of SET-2 registered as the access destination according to the read command and transmits the read values to the host 20. The values of SET-2 at the time of the test finish represent the results of monitoring the attributes during the test period. Thus, the memory device 10 can provide the results of monitoring during the test period to the user.

Thereafter, the user resets the values of SET-2 which have become unnecessary because of having acquired the results of monitoring during the test period. The host 20 transmits a reset command to the memory device 10 to have the values of SET-2 reset, which is registered as the access destination. The user provides, for example, the system including the memory device 10 having undergone the test to an end user. The user can provide the memory device 10 having the values of SET-2 reset to the end user.

In SET-2, the value of each attribute continues being updated starting from its initial value according to the operation state of the memory device 10 after being provided to the end user. For other sets than SET-2, updating the value of each attribute which has continued since before the memory device 10 is provided to the end user, continues.

The end user, through the host 20, instructs the memory device 10 to read the state information 18 at an arbitrary timing. For example, a host 20 which does not have the capability of registering information about access to the memory device 10 transmits a read command that is a request to read the state information 18 to the memory device 10. The memory device 10 reads the values of SET-2 registered as the access destination according to the read command and transmits the read values to the host 20.

In this example case, the host 20 that issues read commands may be one which does not realize that the state information 18 is stored as multiple sets. In response to a request to read the state information 18 from this host 20, the memory device 10 transmits the set designated by the registered-beforehand set number 19 to the host 20. Even a host 20 which does not expect that multiple sets are stored, can obtain the monitoring results according to the access information registered in the memory device 10 by transmitting a read request including the designation of the area where the state information 18 is stored.

The values of SET-2 when read according to the instruction from the end user, represent the results of having monitored the attributes since the memory device 10 was provided to the end user. The memory device 10 provides the end user with the results of monitoring during a period after being provided from the user. Thus, the memory device 10 can meet the user's need to present to the end user the monitoring results according to the operation status after being provided to the end user. The memory device 10 can provide the results of monitoring until an arbitrary timing specified by the user.

After the memory device 10 is provided to the end user, for example, the vendor of the memory device 10 acquires the values of SET-1 from the memory device 10 for failure analysis, warranty determination, or the like. The host 20 which has the capability of registering information about access to the memory device 10, transmits a registration command and read command whose access destination is SET-1 to the memory device 10. The memory device 10 registers SET-1 as the access destination according to the registration command. The memory device 10 reads the values of SET-1 registered as the access destination according to the read command and transmits the read values to the host 20.

The values of SET-1 represent the results of monitoring the attributes obtained by continuing to update their values since the memory device 10 was shipped by the vendor. The memory device 10 continues recording the monitoring results since its shipment and provides the obtained monitoring results. Thus, the memory device 10 can meet the vendor's need to obtain the monitoring results that have been recorded without being reset since its shipment.

The memory device 10 can reset SET-2, . . . , SET-n at arbitrary timings respectively according to the registration of the set number 19 and a reset request. Thus, the memory device 10 can provide the results of monitoring during multiple periods whose timings of starting to monitor the operation state are made different. The memory device 10 can provide a maximum of n number of results of monitoring during the different periods, using n−1 number of sets that can be reset and one set that cannot be reset.

The memory device 10 monitors, for example, items "Power-on Hours Count", "Drive Power Cycle Count", "Error count", "Unexpected Power Loss Count", "Host Writes", and "Host Reads" as attributes of the operation state. The memory controller 11 executes, for example, a reset command when SET-2 is registered as the access destination, thereby resetting the values of all the attributes including these attributes in SET-2.

"Power-on Hours Count" denotes the cumulative number of power-on hours of the memory device 10. Because at the test start the value of "Power-on Hours Count" is reset, the memory device 10 can provide information about test duration time. If a memory device 10 having the value of "Power-on Hours Count" reset is provided to the end user, the memory device 10 can provide information about operation duration time of the memory device 10 measured after being provided to the end user.

"Drive Power Cycle Count" denotes the cumulative number of power-on/off cycles of the memory device 10. Because at the test start of the memory device 10 the value of "Drive Power Cycle Count" is reset, the memory device 10 can provide information about the number of power-ons and -offs of the memory device 10 in the test time. If a memory device 10 having the value of "Drive Power Cycle Count" reset is provided to the end user, the memory device 10 can provide information about the number of times of power-on and off of the memory device 10 counted after being provided to the end user.

"Error count" denotes e cumulative number of errors of the memory device 10. Because at the test start of the memory device 10 the value of "Error count" is reset, the memory device 10 can provide information about the number of errors in the test time.

"Unexpected Power Loss Count" denotes the cumulative number of improper power-cutoffs of the memory device 10. The improper power-cutoff is power-off not done according to the normal procedure. Because at the test start of the memory device 10 the value of "Unexpected Power Loss Count" is reset, the memory device 10 can provide information about the number of improper power-cutoffs in the test time.

"Host Writes" denotes the number of sectors into which data was written by the host 20. Because at the test start of the memory device 10 the value of "Host Writes" is reset, the memory device 10 can provide information about the amount of data written from the host 20 into the memory device 10 in the test time.

"Host Reads" denotes the number of sectors from which data was read by the host 20. Because at the test start of the memory device 10 the value of "Host Reads" is reset, the memory device 10 can provide information about the amount of data read from the memory device 10 into the host 20 in the test time.

The types and definitions of attributes described in the embodiment are all illustrative and can be set as needed. Either of the vendor and user of the memory device 10 may set attributes to be monitored.

According to the first embodiment, the memory device 10 holds first data and second data and can switch the object to be read according to a read request between the first data and the second data. The host 20 issues a read request to read either the first data or the second data. The memory device 10 disables resetting the first data and thereby can continue recording the monitoring results which are not reset. The memory device 10 enables resetting the second data and thereby can record the results of monitoring since an arbitrary monitoring start. The memory device 10 can switch the monitoring results between ones which were recorded without being reset and ones which were recorded during desired periods and provide. The memory device 10 can provide the monitoring results according to the need. The host 20 can acquire the monitoring results according to the need by transmitting a reset request.

Second Embodiment

Figure 5:
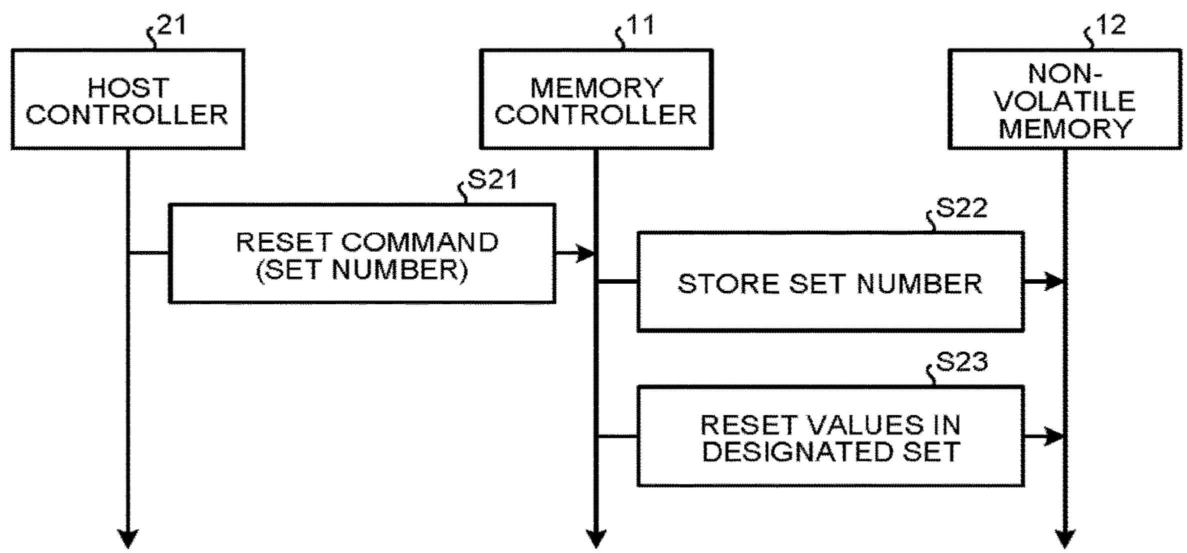
FIG. 5 is a diagram that explains the operation of a memory controller and a host controller of a second embodiment resetting state information.
Figure 6:
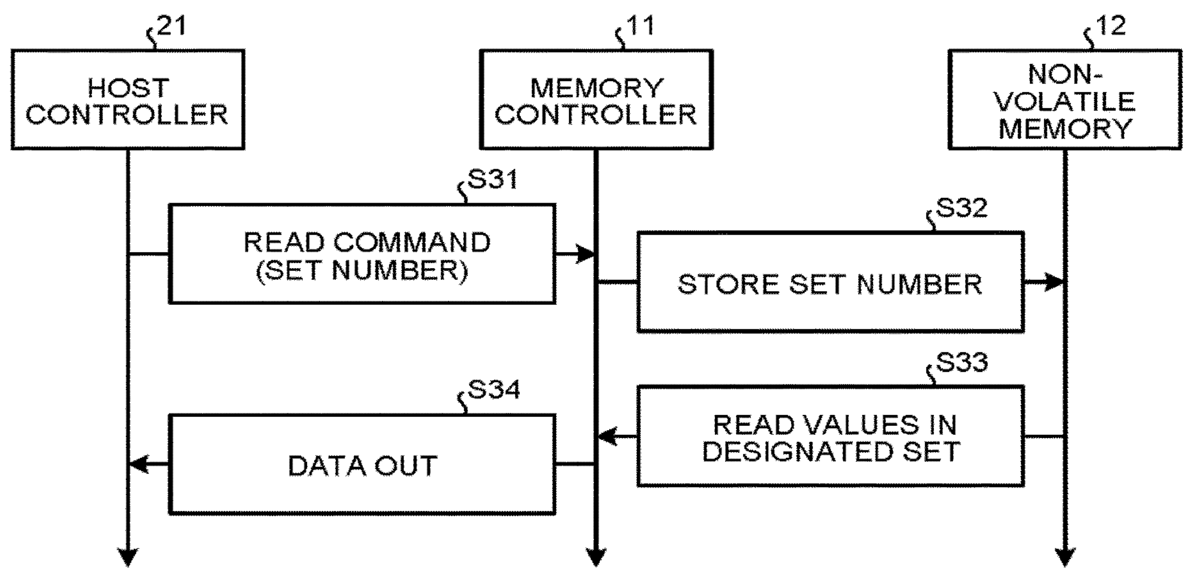
FIG. 6 is a diagram that explains the operation of the memory controller and the host controller of the second embodiment reading state information.

FIGS. 5 and 6 are diagrams that explain the operations of a memory device and a host device of the second embodiment. The memory device and host device of the second embodiment have the same configurations as the memory device 10 and host 20 of the first embodiment respectively. The same reference numerals are used to denote the same parts as in the first embodiment, and duplicate description thereof is omitted.

FIG. 5 is a diagram that explains the operation related to the memory controller 11 and the host controller 21 resetting the state information 18. The host controller 21 issues a reset command that is a request to reset the state information 18. The reset command includes an instruction to register a set number that is access information. The host controller 21 transmits the issued reset command to the memory device 10 (S21).

When receiving the reset command, the memory controller 11 stores the set number into the nonvolatile memory 12, thereby registering the set number (S22). The nonvolatile memory 12 holds the registered set number 19.

The memory controller 11 resets the values in the set designated based on the registered set number 19 out of the state information 18 held in the nonvolatile memory 12 (S23).

Here, where the reset command includes an instruction to register "1" indicating SET-1 as the set number, the memory controller 11 prohibits executing the reset command and performs predetermined error processing. The memory controller 11 excludes SET-1 from objects to be reset according to a request from the host 20 so as to prevent the values in SET-1 from being reset.

Where the reset command includes an instruction to register the value indicating one of SET-2, . . . , SET-n as the set number, the memory controller 11 resets the values in the set given that value as the set number.

FIG. 6 is a diagram that explains the operation related to the memory controller 11 and the host controller 21 reading the state information 18. The host controller 21 issues a read command that is a request to read the state information 18. The read command includes an instruction to register a set number that is access information. The host controller 21 transmits the issued read command to the memory device 10 (S31).

When receiving the read command, the memory controller 11 stores the set number into the nonvolatile memory 12, thereby registering the set number (S32). The nonvolatile memory 12 holds the registered set number 19.

The memory controller 11 reads the values in the set designated based on the registered set number 19 out of the state information 18 held in the nonvolatile memory 12 (S33). The memory controller 11 transmits the read values to the host controller 21 (DATA OUT) (S34).

In the second embodiment, the host 20, which has the capability of registering access information into the memory device 10, transmits a read command to the memory device 10. The host 20 that issues read commands realizes that the state information 18 is stored as multiple sets. In response to the read command from this host 20, the memory device 10 transmits the set having the set number according to the instruction included in the read command to the host 20.

According to the second embodiment, the host 20 issues a read request and reset request that include an instruction to register access information. The memory device 10 receives the read request and reset request. Also in the second embodiment, the memory device 10 can switch the monitoring results between ones which were recorded without being reset and ones which were recorded during desired periods and provide. The memory device 10 can provide the monitoring results according to the need. The host 20 can acquire the monitoring results according to the need by transmitting a reset request.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:

a memory to hold first data and second data that are results of monitoring state of the memory device, the first data and the second data including values indicating results of monitoring attributes common between these data, the values being updated according to operation status of the memory device; and a controller circuit that switches an object to be read from the memory between the first data and the second data, wherein the controller circuit, in response to a received reset request, resets second data designated based on access information, the controller circuit disables resetting the first data according to the received reset request, and the memory holds the first data that represents the results of monitoring state of the memory device during a total period from production or shipment of the memory device.

2. The memory device according to claim 1, wherein the access information is registered in the memory device, and the controller circuit, according to a read request, reads data designated based on the access information out of the first data and the second data.

3. The memory device according to claim 2, wherein the controller circuit receives a first command that is a request to register the access information and a second command that is a read request.

4. The memory device according to claim 2, wherein the controller circuit receives a command that is a read request including an instruction to register the access information.

5. The memory device according to claim 2, wherein the memory holds a plurality of second data, the plurality of second data includes values indicating results of monitoring attributes common between these data, and the access information that designates one of the first data and the plurality of second data is registered in the memory device.

6. The memory device according to claim 1, wherein the access information is registered in the memory device.

7. The memory device according to claim 1, wherein if the access information designating the first data is registered, the controller circuit prohibits resetting according to the reset request.

8. The memory device according to claim 1, wherein the controller circuit receives a first command that is a request to register the access information and a second command that is a reset request.

9. The memory device according to claim 1, wherein the controller circuit receives a command that is a reset request including an instruction to register the access information.

10. The memory device according to claim 1, wherein the memory holds a plurality of second data, the plurality of second data include values indicating results of monitoring attributes common between these data, and the access information that designates one of the plurality of second data is registered in the memory device.

11. A host device which is connectable to a memory device that holds first data and second data that are results of monitoring state of the memory device, the first data and the second data including values indicating results of monitoring attributes common between these data, the values being updated according to operation status of the memory device, the host device comprising:

a controller circuit that issues requests to read the first data and the second data and reads either the first data or the second data based on access information registered in the memory device, wherein the controller circuit issues a reset request to have the memory device reset the second data designated based on the access information registered in the memory device, if the access information designating the first data is registered in the memory device, the memory device resetting according to the reset request is prohibited, and the first data represents the results of monitoring state of the memory device during a total period from production or shipment of the memory device.

12. The host device according to claim 11, wherein the controller circuit issues a read request and receives data designated based on the access information out of the first data and the second data.

13. The host device according to claim 12, wherein the controller circuit issues a first command that is a request to register the access information and a second command that is a read request.

14. The host device according to claim 12, wherein the controller circuit issues a command that is a read request including an instruction to register the access information.

15. The host device according to claim 11, wherein the controller circuit issues a request to register the access information that designates one of the first data and a plurality of second data, and the plurality of second data includes values indicating results of monitoring attributes common between these data.

16. The host device according to claim 11, wherein the controller circuit issues a first command that is a request to register the access information and a second command that is a reset request.

17. The host device according to claim 11, wherein the controller circuit issues a command that is a reset request including an instruction to register the access information.

* * * * *